3,056,647
METHOD FOR PREPARING GRANULAR GELS
Colin B. Amphlett, Abingdon, England, assignor to The United Kingdom Atomic Energy Authority, London, England
No Drawing. Filed June 10, 1957, Ser. No. 664,489
Claims priority, application Great Britain June 8, 1956
3 Claims. (Cl. 23—14.5)

This invention relates to ion-exchange materials and in particular to ion-exchange materials capable of withstanding the action of water at temperatures in the region of 300° C.

It is known that certain insoluble, inorganic compounds of polyvalent metals with various anions can act as ion-exchange materials and are stable at high temperatures. These compounds include zirconium phosphate and tungstate, and the hydrous oxides of zirconium and other polyvalent metals. As commonly prepared, however, these compounds consist of finely crystalline powders, which settle rapidly from solution and are easily separated from solution by filtration. Such materials are not suitable for large-scale use as ion-exchange materials, since they are liable to pack together and prevent liquid flow, and do not provide a large area available for ion-exchange.

It has now been discovered that these compounds may be prepared in gel form, such a gel consisting of amorphous, non-crystalline granules, containing water trapped within their gel structures, which water remains trapped even when the granules are subjected to high temperatures, e.g. 300° C. These granules are porous when dry and present a large area for ion-exchange. They are also of sufficient size to avoid such close packing as would prevent passage of liquids through beds or columns of the granules. An example of an inorganic gel of similar physical properties, but not coming within the scope of this invention is silica gel.

According to the invention, an inorganic ion-exchange material consists of a highly water-insoluble, granular gel comprising in chemical combination at least one polyvalent metal cation, capable of hydrolysis and subsequent polymerisation to yield a highly stable three-dimensional network structure having metal-oxygen-metal bridges, and at least one anion which provides ion-exchange positions in said network structure.

Examples of said polyvalent metal cation are the cations of titanium, zirconium, hafnium, thorium and uranium, and examples of said anion are phosphate, molybdate, tungstate, arsenate, silicate, and hydroxide ions. Combinations of these cations with these anions yield highly insoluble materials and may be obtained in the form of granular gels, containing free acidic or basic groups which provide the ion-exchange capacity of the materials.

One method of preparing said inorganic ion-exchange material comprises the steps of mixing together a solution containing said cations and a solution containing said anions so as to form an insoluble gel, flocculating said gel, and drying the flocculated gel to give a granular product.

The solution containing said cations may be a solution of any simple (i.e. not complexed) salt in water with, if necessary, sufficient acid to prevent hydrolysis and precipitation. For example, the following solutions may be used:

Zirconium sulphate in 2 N sulphuric acid,
Zirconyl nitrate in N nitric acid,
Zirconyl chloride in N perchloric acid
Thorium nitrate in water, or
Titanyl sulphate in N sulphuric acid.

The solution containing said anions may be a solution of a polybasic acid or a soluble salt thereof, or an alkali hydroxide, in water. For example aqueous solutions of the following may be used:

Orthophosphoric acid,
Trisodium phosphate,
Sodium dihydrogen phosphate,
Sodium arsenate ($Na_3AsO_4$),
Sodium tungstate ($Na_2WO_4$),
Sodium molybdate ($Na_2MoO_4$),
Sodium silicate ($Na_2SiO_3$),
Sodium hydroxide,
Potassium hydroxide, or
Ammonium hydroxide.

In order to precipitate the material in the form of a gel, either the solution containing the cations may be added to that containing the anions, or vice versa. Mixing must be efficient, but stirring speed is unimportant provided the solutions are well mixed. Since the viscosity of the mixture increases greatly as the gel forms, it is advisable to use a stirrer with reserve power, so that the gel itself may be stirred well, after adding one solution to the other. The rate of addition of one solution to the other must be sufficiently fast to give rapid gel formation.

The concentration of the solution containing the cations should be high to aid gel-formation, and may for example be close to saturation. The concentration of the solution containing the anions may be varied over a substantial range; for example, higher concentrations aid gel-formation, but too high a concentration of acid in the solution gives powdery products.

The temperature at which the solutions are mixed may be varied over a substantial range, but at temperatures above 50° C., poorer products are obtained due to increasing solubility.

The products are preferably dried at temperatures below 100° C., since they lose ion-exchange capacity if dried at higher temperatures. On the other hand, freeze drying breaks down the gel structure. The preferred drying temperature is within the range 30° to 50° C.

The nature of the invention will be more readily understood by reference to the following examples, in which particular methods of preparing materials according to the invention are described.

Example 1

620 ml. of phosphoric acid solution at room temperature, containing 54.2 g. $H_3PO_4$ per litre, was added rapidly (in less than 10 seconds) to 540 ml. of zirconium sulphate solution in 2 N sulphuric acid also at room temperature, containing 167 g. $Zr(SO_4)_2 \cdot 4H_2O$ per litre. Mixing was carried out, during the addition, by means of an electrically driven laboratory stirrer driven at as high a rate as practicable. These proportions of the reactants were such as to provide a ratio of phosphate ions to zirconium ions of 1.35 to 1 in the mixture. Under the reaction conditions, an insoluble gel of zirconium phosphate was formed. The gel was flocculated by washing repeatedly with distilled water, settling and decanting each time, and the resultant flocculent precipitate of zirconium phosphate was filtered off, washed with water until free from sulphate ions and excess acid, and dried in air at about 50° C. to give a granular product resembling silica gel in physical properties. A yield of 61.6 g. of zirconium phosphate was obtained.

Example 2

540 ml. of phosphoric acid solution of the same concentration as in Example 1 was added rapidly to 556 ml. of a well-stirred solution of zirconyl nitrate in N nitric acid, containing 107 g. $ZrO(NO_3)_2 \cdot 2H_2O$ per litre. The resulting suspension of zirconium phosphate was stirred for a few minutes and then allowed to stand. The zirconium phosphate gel thus formed was then flocculated by washing several times with water by decantation, until it settled well, when it was filtered off, washed with water until free from nitrate ions and excess acid, and dried in air at 30° to 50° C. to give a granular product similar to that of Example 1.

*Example 3*

Zirconium phosphate gel prepared as in Example 2 was flocculated by adding excess alkali, filtered off, washed with water until free from nitrate ions and excess alkali, and dried at 30° to 50° C. to give a granular product similar to that of Example 1.

*Example 4*

540 ml. of trisodium phosphate solution containing 113.4 g. $Na_3PO_4.12H_2O$ was added rapidly to 556 ml. of a solution of zirconyl nitrate as in Example 2. The resulting suspension of zirconium phosphate was treated as in Example 2 or Example 3 to give a granular product similar to that of Example 1.

*Example 5*

93 ml. of sodium dihydrogen phosphate solution containing 47.4 g. $NaH_2PO_4.2H_2O$ was added rapidly to 556 ml. of a solution of zirconyl nitrate as in Example 2. The resulting suspension of zirconium phosphate was treated as in Example 2 or Example 3 to give a granular product similar to that of Example 1.

*Example 6*

540 ml. of sodium arsenate solution containing 126.5 g. $Na_3AsO_4.12H_2O$ was added rapidly to 556 ml. of a solution of zirconyl nitrate as in Example 2. The resulting suspension of zirconium arsenate was treated in the same way as the zirconium phosphate in Example 2 or Example 3 to give a granular zirconium arsenate.

*Example 7*

34 ml. of a molar sodium tungstate solution containing 11.25 g. $Na_2WO_4.2H_2O$ was added rapidly to 39 ml. of a zirconium sulphate solution in 2 N sulphuric acid containing 6.1 g. $Zr(SO_4)_2.4H_2O$. The resulting suspension of zirconium tungstate was treated in the same way as the zirconium phosphate in Example 2 or Example 3 to give a yield of 9.5 g. of a granular zirconium tungstate.

*Example 8*

25 ml. of sodium molybdate solution containing 8.0 g. $Na_2MoO_4.2H_2O$ was added rapidly to 49 ml. of zirconium sulphate solution in 2 N sulphuric acid containing 6.1 g. $Zr(SO_4)_2.4H_2O$. The resulting suspension of zirconium molybdate was treated in the same way as the zirconium phosphate in Example 2 or Example 3 to give a yield of 6.0 g. of a granular zirconium molybdate.

*Example 9*

40 ml. of a phosphoric acid solution of the same concentration as in Example 1 was added rapidly to 30 ml. of a thorium nitrate solution in water containing 6.6 g. $Th(NO_3)_4.4H_2O$. The resulting suspension of thorium phosphate was treated in the same way as the zirconium phosphate in Example 2 or Example 3 to give a granular thorium phosphate.

*Example 10*

40 ml. of a phosphoric acid solution of the same concentration as in Example 1 was added rapidly to 30 ml. of a thorium nitrate solution in 2 N sulphuric acid containing 6.6 g. $Th(NO_3)_4.4H_2O$. The resulting suspension of thorium phosphate was treated in the same way as the zirconium phosphate in Example 2 or Example 3 to give a granular thorium phosphate similar to that obtained by the method of Example 9.

*Example 11*

36 ml. of sodium tungstate solution containing 12.0 g. $Na_2WO_4.2H_2O$ was added to 30 ml. of a thorium nitrate solution as in Example 9 or Example 10. The resulting suspension of thorium tungstate was treated in the same way as the zirconium phosphate in Example 2 or Example 3 to give a granular thorium tungstate.

*Example 12*

27 ml. of sodium molybdate solution containing 8.8 g. $Na_2MoO_4.2H_2O$ was added to 30 ml. of a thorium nitrate solution as in Example 9 or Example 10. The resulting suspension of thorium molybdate was treated in the same way as the zirconium phosphate in Example 2 or Example 3 to give a granular thorium molybdate.

*Example 13*

3 g. of titanium dioxide was fused with an excess of potassium hydrogen sulphate and the melt extracted into N sulphuric acid solution to give a solution of titanyl sulphate ($TiOSO_4$) in sulphuric acid. To this solution was added rapidly 100 ml. of a phosphoric acid solution of the same concentration as in Example 1. The resulting suspension of titanium phosphate was treated in the same way as the zirconium phosphate in Example 2 or Example 3 to give a granular titanium phosphate.

*Example 14*

1300 ml. of 2 N aqueous sodium hydroxide was added to and mixed with 670 ml. of a zirconium sulphate solution of the same composition as that used in Example 1, under the same conditions and using the same technique as in Example 1, so as to form an insoluble gel of hydrous zirconium oxide. After flocculation and filtration the flocculent precipitate of hydrous zirconium oxide was washed until free from sulphate ions, and dried at 50° C. in air to give a granular product. A yield of 47 g. hydrous zirconium oxide was obtained.

*Example 15*

100 ml. of sodium hydroxide solution containing 16 g. NaOH was added to and mixed with 50 ml. of a thorium nitrate solution in water containing 30 g.

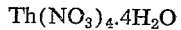

under the same conditions and using the same technique as in Example 1, so as to form an insoluble gel of hydrous thorium oxide. After flocculation and filtration the fluocculent precipitate of hydrous thorium oxide was washed until free from nitrate ions, and dried at 50° C. in air to give a granular product. A yield of 20 g. hydrous thorium oxide was obtained.

Another method of preparing inorganic ion-exchange materials which are in accordance with the present invention comprises treating a granular oxide gel, which is already an ion-exchange material in accordance with the invention, with a polybasic acid, so as to convert the said oxide gel to a highly-insoluble granular gel consisting of an insoluble acid salt of said polybasic acid. For example the said oxide gel may be treated with phosphoric or arsenic acid to convert it to the corresponding insoluble phosphate or arsenate gel.

An example of the preparation of a granular ion-exchange material by means of this method is as follows:

*Example 16*

10 g. of granular zirconium oxide prepared by the method of Example 14 was treated with phosphoric acid by standing overnight in 50 ml. of a phosphoric acid solution containing 54.2 g. $H_3PO_4$ per litre. The excess acid was decanted and the solid product filtered off, washed until free of free acid and excess phosphate ions, and dried at 30° to 50° C. A granular zirconium phosphate was obtained similar in properties to the products of Examples 1 to 5.

The granular products of all the Examples 1 to 16 are gel materials which shrink and crack during drying. On treatment with water, they break down to a particle size distribution characteristic of the particular method of preparation. In all cases, however, they remain granular and suitable for ion-exchange applications. After subsequent drying at 30° to 50° C., no further breakdown occurs on immersion in water. All these granular materials are very stable in water at temperatures up to 300° C., and also are stable to boiling concentrated nitric acid.

The zirconium phosphate products of Examples 1 to 5 and Example 16 have cation-exchange properties, attributed to the ionisable hydrogen atoms present on the acid phosphate groups in their structure, and have a cation-exchange capacity which varies with the ratio of phosphate to zirconium in the product and also on the pH of the medium in which the capacity is measured. At low values of the ratio of phosphate to zirconium, the exchange capacity is small in acid solution; as the ratio increases, the capacity also increases, reaching a maximum when the ratio reaches 1.5 to 1, beyond which no improvement occurs. At a ratio of 1.33 to 1, as in the product of Example 1, the ion-exchange capacity measured at room temperature varies from about 1 milliequivalent per gram at pH 2 to about 5 milliequivalents per gram at pH 11 to 12.

The products of Examples 6 to 13 have similar ion-exchange properties to the zirconium phosphate products, and have ion-exchange capacities of at least about 1 milliequivalent per gram.

The thorium oxide and zirconium oxide products of Examples 14 and 15 respectively, being amphoteric in character, have anion-exchange properties in acid and neutral solutions, by virtue of hydroxide ions formed by the ionisable hydroxide groups in their structures, and cation-exchange properties in alkaline solution, by virtue of hydrogen ions formed by ionisation of the hydrogen atoms of the said hydroxide groups. Their ion-exchange capacity in both acid and alkaline solutions is about 1 milliequivalent per gram. Their anion-exchange capacity in acid solution decreases as the pH increases.

The ion-exchange materials of the invention may be used for the removal of undesirable ions in high temperature, pressurised-water circuits without the necessity of first cooling the water to normal temperatures. Also the inorganic character of the materials makes them suitable for use under conditions of intense radioactivity where organic resins would break down. Thus, they are adapted particularly to the removal of soluble fission and corrosion products in high temperature water circuits in atomic reactors, and the removal of impurities from high-pressure boiler water. In particular, corrosion products such as iron and nickel are very strongly held by these materials, and require drastic treatment to remove them.

The anion exchange properties of certain of the materials makes possible the use of mixed ion-exchange beds for the removal of both cations and anions.

The ion-exchange materials of the invention may also be used as catalysts for certain chemical reaction, for which organic ion-exchange resins have previously been used, e.g. organic condensations, cyclisations, and the like, which are acid or base catalysed. An advantage of their use for this purpose is that, being insoluble, they may be easily separated from the reaction mixture. A further advantage is that they may be used in reactions at much higher temperatures owing to their greater stability, compared with organic ion-exchange materials, thus extending the range of ion-exchange catalysis in this field.

I claim:

1. A method of preparing a gel having a large area for cation-exchange comprising thoroughly mixing together a solution containing cations of a metal selected from the group consisting of titanium, zirconium, hafnium, and thorium, and a solution containing anions selected from the group consisting of phosphate, arsenate, molybdate, and tungstate ions to form a gel, repeatedly washing the gel with water to flocculate the gel, drying the flocculated gel at a temperature below 100° C. and above the freezing point of water to form a granular product, and treating the granular product with water to break down the granules to a stable size distribution.

2. A method according to claim 1 wherein the gel is flocculated by repeatedly washing it with an aqueous alkali.

3. A method according to claim 1 wherein the flocculated gel is dried at a temperature of about 30–50° C.

References Cited in the file of this patent

UNITED STATES PATENTS 1,935,178   Connolly _____ Nov. 14, 1933
2,157,511   Urbain et al. _____ May 9, 1939

OTHER REFERENCES

Kraus et al., in "Nature," vol. 177, April–June 1956, pages 1128–9, January article.

Larsen et al.: "Industrial and Engineering Chemistry," vol. 15, No. 8, pages 512 to 515, 1943.

Kraus et al.: "Journal of American Chemical Society," vol. 78, pages 249 and 694.

Mellor: "Comprehensive Treatise on Inorganic and Theoretical Chemistry," Longmans, Green and Co., N.Y., vol. 9, page 188 (1929), vol. 11, pages 565, 791 and 792 (1931).

Amphlett et al.: "Chemistry and Industry," November 10, 1956, pages 1314 and 1315.